Jan. 25, 1966   R. J. TOMSON   3,231,449
APPARATUS FOR SEALING THERMOPLASTIC MATERIAL
Filed July 14, 1964   6 Sheets-Sheet 1

INVENTOR
RICHARD J. TOMSON

Jan. 25, 1966  R. J. TOMSON  3,231,449
APPARATUS FOR SEALING THERMOPLASTIC MATERIAL
Filed July 14, 1964  6 Sheets-Sheet 2

INVENTOR
RICHARD J. TOMSON

AGENT

Jan. 25, 1966   R. J. TOMSON   3,231,449
APPARATUS FOR SEALING THERMOPLASTIC MATERIAL
Filed July 14, 1964   6 Sheets-Sheet 3

INVENTOR
RICHARD J. TOMSON

Jan. 25, 1966 R. J. TOMSON 3,231,449
APPARATUS FOR SEALING THERMOPLASTIC MATERIAL
Filed July 14, 1964 6 Sheets-Sheet 4
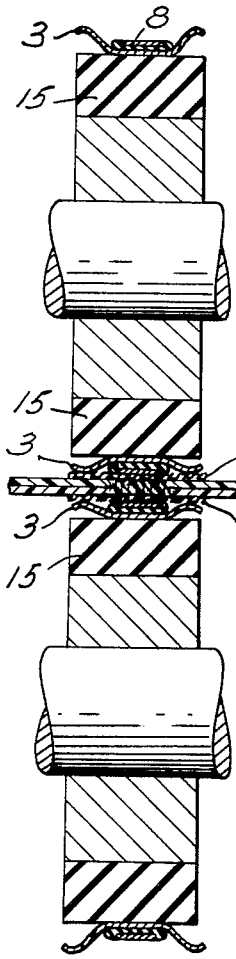
Fig. 12
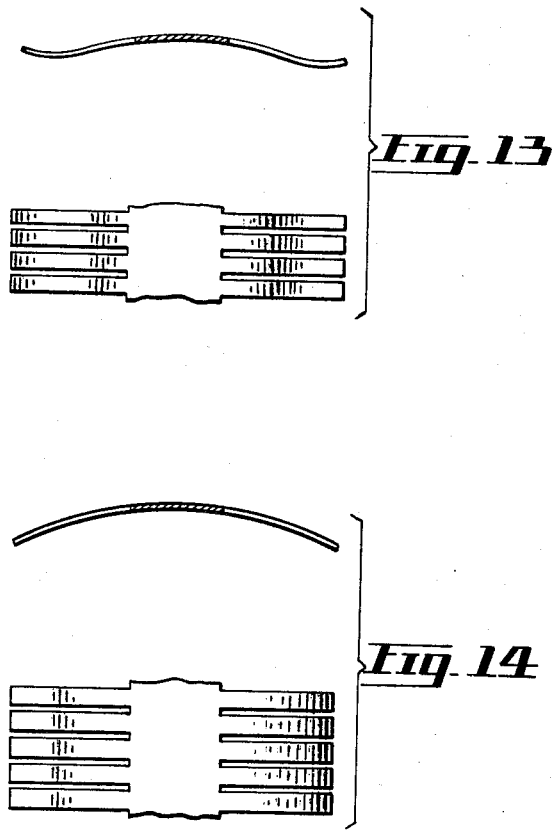
Fig. 13
Fig. 14
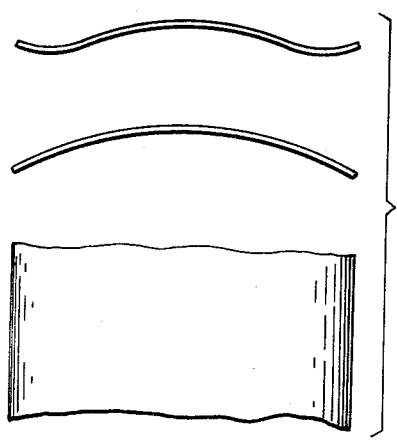
Fig. 15
INVENTOR
RICHARD J. TOMSON
AGENT Jan. 25, 1966   R. J. TOMSON   3,231,449
APPARATUS FOR SEALING THERMOPLASTIC MATERIAL
Filed July 14, 1964
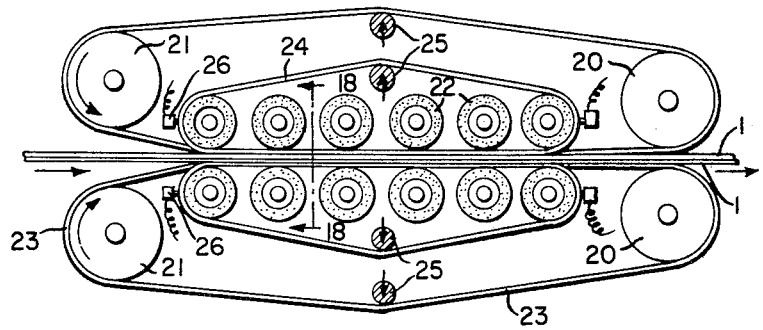
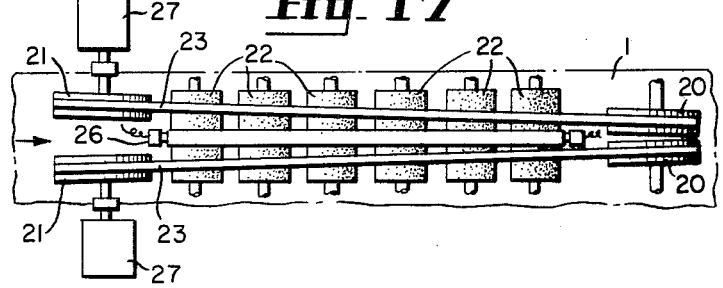
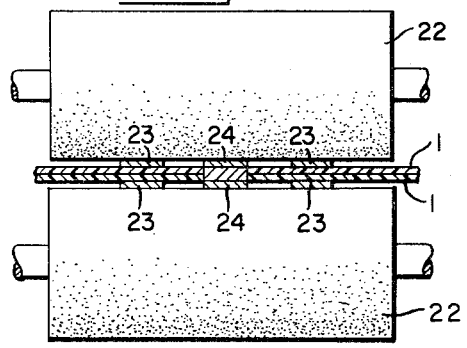
INVENTOR
RICHARD J. TOMSON

INVENTOR
RICHARD J. TOMSON

BY *Albert C. Hodgson*

AGENT

United States Patent Office 3,231,449
Patented Jan. 25, 1966

3,231,449
APPARATUS FOR SEALING THERMOPLASTIC MATERIAL
Richard Johann Tomson, St. Laurent, Quebec, Canada, assignor, by mesne assignments, to E. I. du Pont de Nemours and Company, Wilmington, Del., a corporation of Delaware
Filed July 14, 1964, Ser. No. 383,557
Claims priority, application Canada, Apr. 13, 1962, 666,648
1 Claim. (Cl. 156—583)

This invention is concerned with the sealing of thermoplastics. In particular it relates to the sealing of thermosplastic films and thermoplastic coated materials.

Present conventional methods of sealing weaken the parent film material adjacent to the portion of the material which forms the heat seal. Thus, when such material is placed under stress, it will initially fail at the edge of a heat seal. It is therefore obvious that these heat seals do not utilize the full available strength of the parent material.

Existing heat sealing methods fall into three categories. In the first, the jaw type, two heated jaws are pressed together with the film layers between them. The heat melts the film material and the pressure fuses the layers together. The pressure applied by the jaws squeezes out some molten film with the result that after solidification the film thickness of the edge of the heat seal is reduced. A second disadvantage is that the jaws are opened while the heat seal is still in the molten state and damage to the seal can result.

The second method is by impulse heat sealing in which one or two heat sealing bands are forced by cushioned unheated jaws against the film layers. A current is then passed through the heating bands melting the film and the pressure applied by the jaws fuses the film layers together. The disadvantages are the same as in the jaw type of heat sealing. Some molten material is squeezed out of the heat seal which weakens the film and the heat seal is damaged when the sealing bands are lifted from the still molten seal.

The third method is a continuous heat sealing operation in which two endless bands are driven by rotating pulleys. These bands are pressed together against the film layers by stationary heated jaws. The disadvantages are more or less the same as above. Although the bands do not squeeze out as much liquid film material as in the other two cases, some squeezing still takes place and weakens the film adjacent to the heat seal. During the cooling period the film layers with the molten heat seal are supported by the bands. However, this is not positive and some deformation of the heat seal results. This deformation is more pronounced in the case of a vertical heat sealing operation.

An object of this invention is to maintain the thickness of the material at the seal with the resultant strength being equal to that of the parent material.

Another object of this invention is to permit the seal thickness and strength to be controlled with the result that the strength of the seal may be greater, less or equal to that of the parent material.

Another object of this invention is to provide a means of moving the material on one or both sides of the seal towards that portion of the material which has been heated to form a molten pool thus preventing a reduction in thickness of the material at the seal or even increasing the thickness of the material at the seal if desired.

A further object of this invention is to provide a means of reducing the time required to produce a satisfactory seal.

Yet another object of this invention is the provision of a means of using known heaters such as continuously heated or impulse type heaters to produce the above-described seals.

An important object of this invention is the provision of a transporting band or bands on one or both sides of the material being sealed thus permitting the material to be moved immediately following contact with the heater with a resultant saving in time and with no detrimental effects on the seal.

Other objects of the present invention will appear from the more detailed description set forth below, it being understood that such more detailed description is given by way of illustration and explanation only and not by way of limitation, since various changes therein may be made by those skilled in the art without departing from the scope or spirit of the present invention.

In connection with that more detailed description—

FIGURE 12 is a cross section of the apparatus in FIGURE 11 on the line 12—12;

FIGURE 13 is a plan and cross section of a compression band;

FIGURE 14 is a plan and cross section of another type of compression band;

FIGURE 15 is a plan and two cross sections showing two types of flat compression bands;

FIGURE 16 is a side elevation of another apparatus using converging bands on either side of the seal;

FIGURE 17 is a plan view of the apparatus in FIGURE 16;

FIGURE 18 is a cross section view of the apparatus in FIGURE 16 on the line 18–18;

In accordance with the present invention which is hereafter called the compression heat sealing method, the reduction of the film thickness adjacent to the heat seal has been eliminated. By this invention it is possible to maintain the thickness at the edge of the heat seal equal to the thickness of the parent material, or if desired the thickness at the edge of the seal can be made greater or less than the parent material. Thus, the resultant strength of the seal will be equal to, or greater or less than the parent material as desired.

Figure 1:
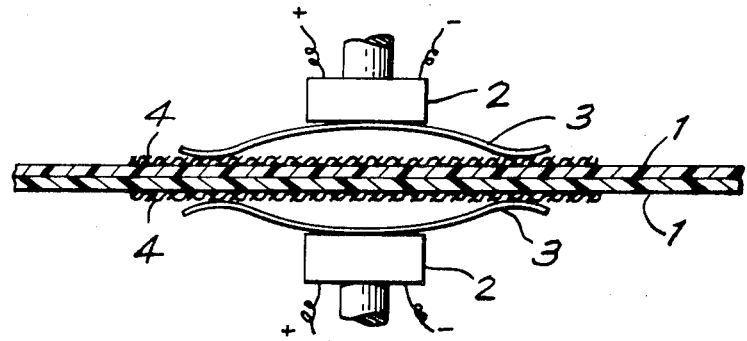
FIGURE 1 represents a cross section of a jaw type sealer in open position.

Referring now to the drawings the compression type heat sealing method is illustrated in FIGURE 1 which shows the heat sealing apparatus in the open position for jaw type heat sealing. Both sides of the film layers 1 to be heat sealed are forced together by the heated jaw 2 and specially formed compression bands 3. These bands preferably are manufactured of a heat-resisting steel although other suitable materials can be used. Transporting bands 4 are located between the compression bands and the film layers. These bands are fabricated from woven or knitted cloth or other such material made of a synthetic fibre such as nylon, polytetrafluoroethylene or glass fibre, or a natural fibre such as cotton. Any similar flexible material that can withstand the operating temperature of the heat sealing operation can be used.

Figure 2:
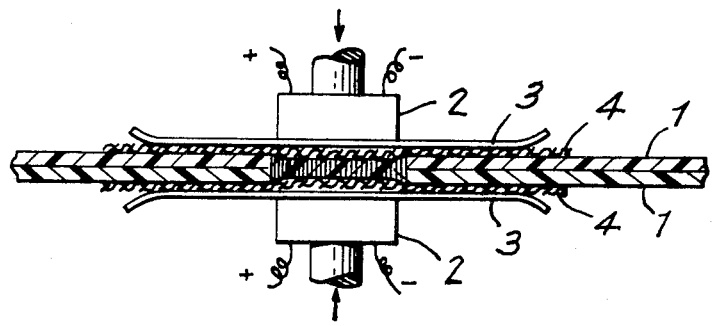
FIGURE 2 is a cross section of a jaw type sealer in closed (sealing) position.
Figure 3:
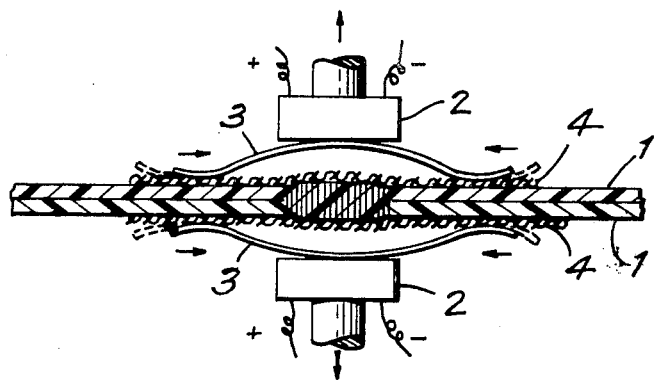
FIGURE 3 is a cross section of a jaw type sealer in open (retracted) position.

FIGURE 2 shows the heat sealing apparatus in closed or sealing position. In order to accomplish a heat seal the heated jaws 2 are forced together as shown by the arrows, the curved compression bands 3 are flattened and the edges of the bands slide outward on the transporting bands 4. The fusion heat for heat sealing is conducted through the compression and transporting bands to both sides of the film layers. The heat melts the film material and the pressure applied by the jaws serves to fuse the layers together. After the fusion period the jaws are opened again as shown in FIGURE 3.

During the opening period the pressure from the jaws 2 is released and the compression bands return to their original shape. This results in an inward movement of the edges of the compression bands. The film layers are still pressed together between the edges of the compression bands 3 and this inward movement forces the unmolten film material at the edge of the heat seal into the liquid pool of the heat seal. This results in a swelling of the film layers adjacent to the heat seal and an increase in the thickness at the fusion line between the molten and solid film material. Furthermore, the loose woven or knitted structure of the transporting bands permits the molten film material to stick to said transporting bands. In this manner the liquid pool is held at the top and bottom by the transporting bands while being compressed by the unmolten film layers which are moved inwardly by the edges of the compression bands.

After the heating jaws are opened the film layers can be moved away by the transporting bands. The heat seal is still in a molten state but it cannot be stressed or deformed by mechanical movement since it is supported by the transporting bands. Actually the transporting bands are stuck to the heat seal but can be stripped off easily after the seal has solidified.

Thus, by using the compression method of heat sealing the thickness and, as a result, the strength of the seal can be controlled. Furthermore, by using the transporting bands the seal is not affected by gravity or mechanical handling during the cooling period. Since the film must be between the heat sealing jaws only during the time of fusion and can be removed for the cooling cycle, the total time for heat sealing is reduced.

Figure 4:
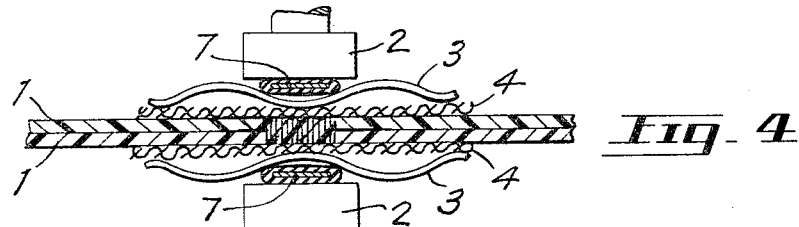
FIGURE 4 is a cross section of a jaw type sealer with an impulse heater on the outside of the compression bands.
Figure 5:
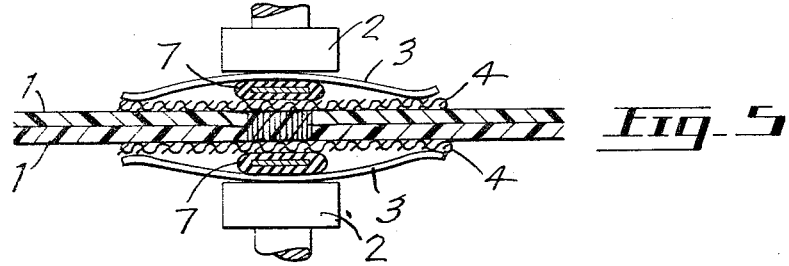
FIGURE 5 is a cross section of a jaw type sealer with an impulse heater on the inside of the compression bands.

The compression type heat sealing method can be used in conjunction with impulse type heaters. FIGURE 4 illustrates the case when the heaters 7 are outside the compression bands 3 and FIGURE 5 shows the heaters 7 inside the compression bands 3.

The operation is similar to the previous case. When the jaws are closed the compression and heating bands are forced against both sides of the film layers. An impulse of electric current is passed through the heating bands, rapidly raising their temperature. The heat is conducted to the film resulting in a seal. During the opening period of the jaws, the heat seal is compressed by the compression bands and moved by the transporting bands. When the impulse heaters are located inside the compression bands the heaters would normally be covered with an insulating material such as polytetrafluoroethylene impregnated glass fibre cloth.

The compression heat sealing method can also be used in conjunction with continuous and wheel type heat sealing operations. These applications are described below.

Figure 6:
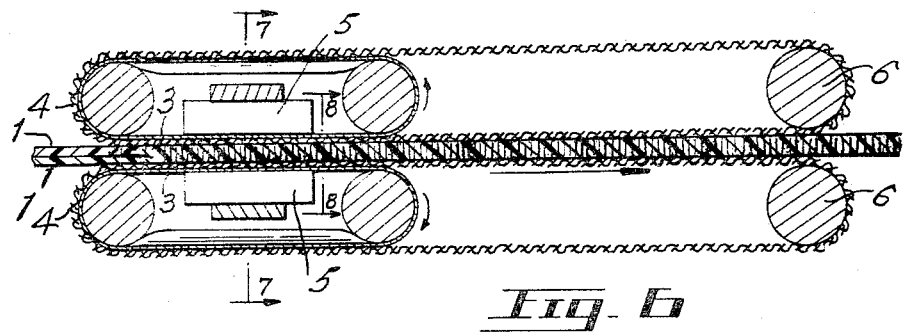
FIGURE 6 is a longitudinal view of continuously heated jaws in a continuous heat sealing operation.

The compression method used with continuously heated jaws in a continuous heat sealing operation, is shown in FIGURE 6.

Figures 7, 8:
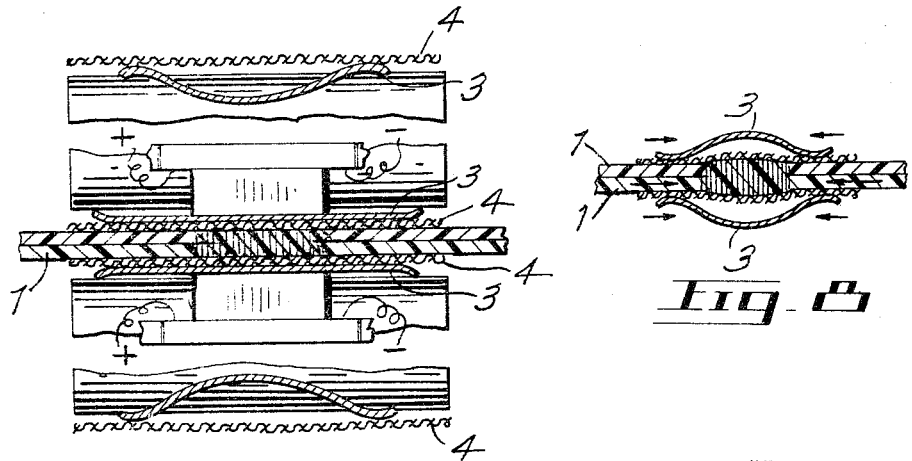
FIGURE 7 is a cross section of the apparatus in FIGURE 6 on the line 7—7.
FIGURE 8 is a cross section of the apparatus in FIGURE 6 on the line 8—8.

In this arrangement the stationary heated jaws 5 are kept pressed together and the compression 3 and transpoorting bands 4 with the film 1 between them are moved continously into the gap between the jaws 5. At the entrance to the jaws the compression bands are flattened as illustrated in FIGURE 7 and the material is melted by the heat and fused together. After the bands with the molten heat seal leave the jaws, the compression bands return to their original curved shape and compress the heat seal as is illustrated in FIGURE 8. The heat seal cools while being moved and the film is stripped off the transport bands when said bands start to return over the pulleys 6.

Figure 9:
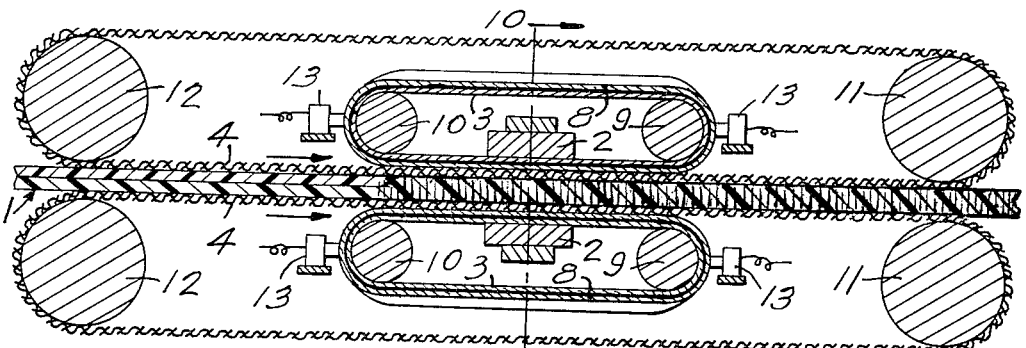
FIGURE 9 is a longitudinal view of continuously heated band heaters in a continuous heat sealing operation.

FIGURE 9 illustrates the use of the compression type heat sealing method with continuously heated heat sealing bands. This operation is a continuous one employing two endless heater 8 and compression 3 bands strung over driven 9 and idler 10 pulleys. The endless transport bands 4 are strung over separate driven 11 and idler 12 pulleys.

The film layers 1 enter at the left, and are carried by the transporting bands 4 between the heating 8 and compression 3 bands (which move at the same speed at the transporting bands) into the gap between the fixed unheated jaws 2. The heater bands are fed electricity by brushes 13.

Figure 10:
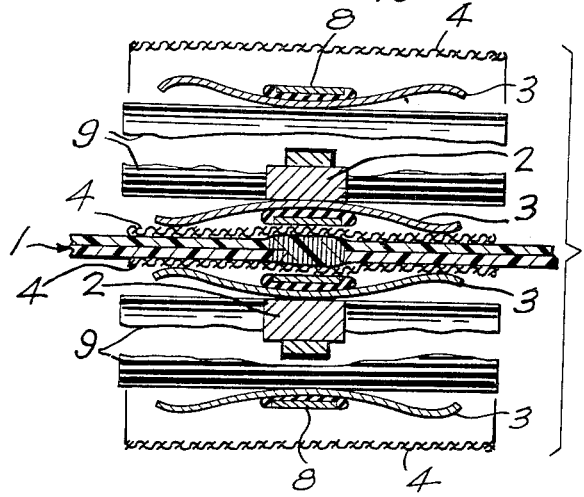
FIGURE 10 is a cross section of the apparatus in FIGURE 9 on the line 10—10.

At the entrance to the jaws the compression bands are flattened as is illustrated in FIGURE 10 and the heating bands are pressed against the film layers. The heat and pressure application produces the heat seal. At the exit end of the stationary jaws the pressure on the compression bands is removed and these bands take up their original curved shape causing the heat seal to be compressed as described above.

Figure 11:
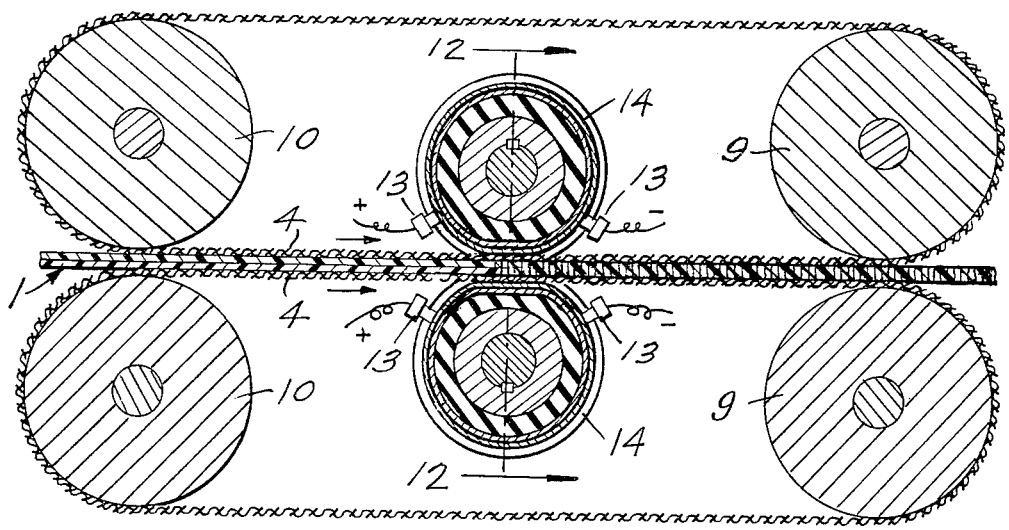
FIGURE 11 is a side elevation of a wheel type heat sealer.

The compression type heat sealing method adopted for use with a wheel type heat sealer is illustrated in FIGURES 11 and 12. In this embodiment a set of heating 8 and compression 3 bands is wrapped around the periphery of each of two rotating wheels 14. Between the compression band and the hub of each wheel there is a layer of a soft flexible material such as silicone rubber 15. This covering is flattened on contact with the mating wheel resulting in the time of such contact and thus of sealing being lengthened. The heating bands are fed electricity continuously by brushes 13 to provide the required heat. The two sealing wheels 14 are mounted between two sets of driven 9 and idler 10 pulleys. The film layers to be heat sealed are carried by the transport bands 4 into the nip of the sealing wheels between the heating 8 and compression bands 3 causing the compression bands to be flattened. The heating bands thus press against the film resulting in the melting and fusion of the film layers. At the exit side of the wheels the compression bands are allowed to return to their normal configuration thus compressing the still molten seal. If designed short enough this unit can be used to make curved seals.

FIGURES 13, 14 and 15 illustrate three major types of compression bands used in the above applications.

FIGURE 13 is a double curvature type and is used when thin and medium gauge films are to be heat sealed.

FIGURE 14 is used for medium and heavy gauge films and when multiple layer heat seals are required.

FIGURE 15 is used in connection with straight jaw type heat seals. Two cross sections are shown to illustrate bands used with light and heavy film.

Compression bands shown in FIGURES 13 and 14 have slotted edges. The reason for this is two-fold. First the slots prevent mechanical overstressing of the band edges when they are wrapped around a pulley. Secondly the slots minimize thermal stresses in the band. Since the heat is applied at the central portion, the thermal expansion is greater at the center than at the edges where the temperature is lower.

FIGURE 16 illustrates another concept of this invention. Again the principle involved is to move the material on either side of the seal toward the molten pool of the seal to prevent the material at the seal from being squeezed out and thus weakening the resultant seal. The apparatus shown is operated on a continuous basis. Material 1 to be sealed is fed in at the left-hand side of the apparatus in FIGURE 16 between continuous flat bands 23. These bands are wrapped around driven pulleys 21 and idler pulleys 20. As will be seen from the plan view in FIGURE 17 the bands converge and are closer together at the discharge end of the sealing appartus than at the feed end. Motors 27 drive the pulleys 21.

The conveying flat bands 23 convey the material 1 into the apparatus where it is heated and sealed by coming in contact with or in close proximity to the sealing bands 24. The sealing bands are heated by electricity from brushes 26. A plurality of flexible, covered pressure rollers 22 press the flat bands 23 and the sealing bands 24 against the material to be sealed. It has been found that it is not necessary to drive the pressure rollers 22 as motion is imparted to them by the flat bands, and in turn transmitted from the pressure rollers to the sealing bands 24. Tension rolls 25 are used to ensure that the proper tension is maintained on all bands.

Figure 19:
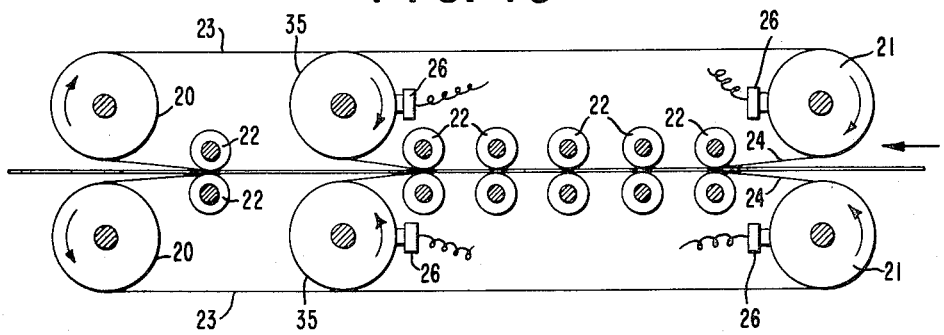
FIGURE 19 is a side elevation of another embodiment of the heat sealing apparatus employing converging bands on only one side of the seal.

FIGURE 19 illustrates another concept of this invention. The principle involved is to move the material on one side of the seal toward the molten pool of the seal to prevent the material at the seal from being squeezed out and thus weakening the resultant seal. The apparatus shown is operated on a continous basis. By utilizing only one pair of conveying bands and having such bands located on the side of the seal away from the edge of the thermoplastic film being sealed, waste material which would occur on the edge side of the film is eliminated.

Figure 20:
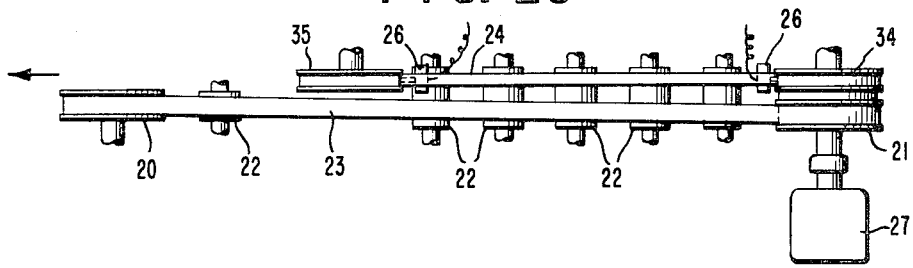
FIGURE 20 is a plan view of the apparatus of FIGURE 19.

Material to be sealed is fed in at the right-hand side of the apparatus as shown in FIGURE 19 between a pair of continuous flat conveying bands 23 and a pair of continuous sealing bands 24. The conveying bands 23 are disposed around driven pulleys 21 and idler pulleys 20. As will be seen from the plan view in FIGURE 20 the conveying bands 23 converge upon the sealing bands 24 and are closer to the sealing bands 24 at the discharge end of the sealing apparatus than at the feed end. The sealing bands 24 are disposed around driven pulleys 34 and idler pulleys 35. Motors 27 drive the pulleys 21 and 34. The conveying bands 23 and the sealing bands 24 convey the material into the apparatus where it is heated and sealed by the sealing bands 24. The sealing bands 24 are heated by electricity from brushes 26. A plurality of flexible, fabric covered pressure rollers 22 press the bands 23, 24 against the material to be sealed. As the conveying bands 23 converge toward the sealing bands 24, additional material is delivered to the molten seal resulting in a stronger resultant seal.

The time required for sealing depends on a number of factors such as the characteristics and thickness of the film. However, the exact time can be easily found by experiment. This required sealing time, in conjunction with the linear speed of operation desired, will give the length of the sealing zone.

It will be noted that during the time the material is in the apparatus, it is being continually subjected to a lateral force caused by the converging effect of the moving flat converging bands 23 which tend to move the material on one or both sides of the seal into the molten pool of the seal to give a very similar reinforced seal to that obtained from the use of the spring like bands.

In practice when these converging bands are used on fairly light materials, say below 4 mil, it has been found that this material is not stiff enough to withstand the lateral forces caused by the converging bands. Wrinkles have resulted and the reinforcing effect has not been carried to its fullest. To overcome this problem a fairly stiff transporting band has been used behind the sealer band and running about the flexible pressure rollers.

In addition, a thin coating of silicone oil is normally applied to the surface of the sealing bands to prevent them from sticking to the seal. When this is done the electrical brushes can be located on the inside of the band.

The compression type heat sealing has been used very successfully not only for heat sealing two layers of film but also for heat sealing of multiple layers of film. The physical properties of each layer are not affected by the heat seal as is usual in conventional heat sealing methods.

As an example an 8-layer sample of 8 mil low pressure polyethylene film was heat sealed with the result that none of the layers could be separated from the bundle and none of the layers was weakened by the heat seal.

A very difficult sealing problem arises when dusty materials must be sealed. This is particularly true in the industrial bag field. After a bag has been filled with a dusty granular material, the closing seal is extremely difficult to effect. It has been found, however, that under such conditions, seals of very high strength can be made using the methods herein disclosed.

The compression type heat sealing method can also be used without the transporting bands. In this case the compression bands are covered with an insulating material such as polytetrafluoroethylene, glass fibre, nylon or other suitable material to facilitate removal of the seal which will stick to the compression bands.

In the foregoing description use has been made of films in the simple examples, however, this is meant in no way to limit the scope of this invention as it is equally applicable to thermoplastics in general and to thermoplastic coated materials. And, indeed, where reference is made to thermoplastic materials the inclusion of thermoplastic coated materials is intended and is omitted only for purposes of simplicity.

Hereafter is set forth an illustrative list of thermoplastic materials which can be used with this invention: polyethylene having a density of .9125 to .975, polyvinyl chloride, polypropylene, nylon, polyesters, polyolefins, polystyrene, polybutene, rubber hydrochloride, blends of polyethylene with polypropylene, polyvinyl chloride, elastomers such as polyisobutylene, chlorinated polyethylene, ethylene propylene compositions, polyvinyl acetate, ethylene/vinyl acetate copolymers and copolymers of ethylene with vinyl acetate, butene-1, propylene, pentene-1 and octene-1.

This application is a continuation-in-part of my copending application Serial No. 228,790, filed October 4, 1962, which is in turn a continuation-in-part of application Serial No. 121,741, filed July 3, 1961.

I claim:

An apparatus for sealing thermoplastic material comprising in combination a first and a second pair of converging conveying means adapted to engage the surface of the thermoplastic material to be sealed at two adjacent spaced apart points and to convey said points along lines from a point where they are spaced apart to a point where they are more closely adjacent, thereby applying lateral converging pressure to the material between said two adjacent spaced apart points; heating means consisting of at least one continuous metallic band disposed between said first and second conveying means and in contact with said material to be sealed and adapted to create a zone of heat and pressure in said material between said two adjacent spaced apart points, said conveying means and said heating means being adapted to travel at the same rate as the material to be sealed.

References Cited by the Examiner

UNITED STATES PATENTS

| | | | |
|---|---|---|---|
| 2,107,249 | 2/1938 | Hepke | 156—583 |
| 2,379,500 | 7/1945 | Steffens | 156—304 |
| 2,384,014 | 9/1945 | Cutter | 156—499 |
| 2,438,685 | 3/1948 | Stevens | 156—304 |
| 2,490,111 | 12/1949 | Whitehead | 156—583 |
| 2,516,280 | 7/1950 | Welch | 156—304 |
| 2,535,171 | 12/1950 | Sundstrom | 156—289 |
| 2,994,361 | 8/1961 | Gable et al. | 156—306 |
| 3,001,904 | 9/1961 | Porepp | 156—306 |

EARL M. BERGERT, *Primary Examiner.*

DOUGLAS J. DRUMMOND, *Examiner.*